UNITED STATES PATENT OFFICE.

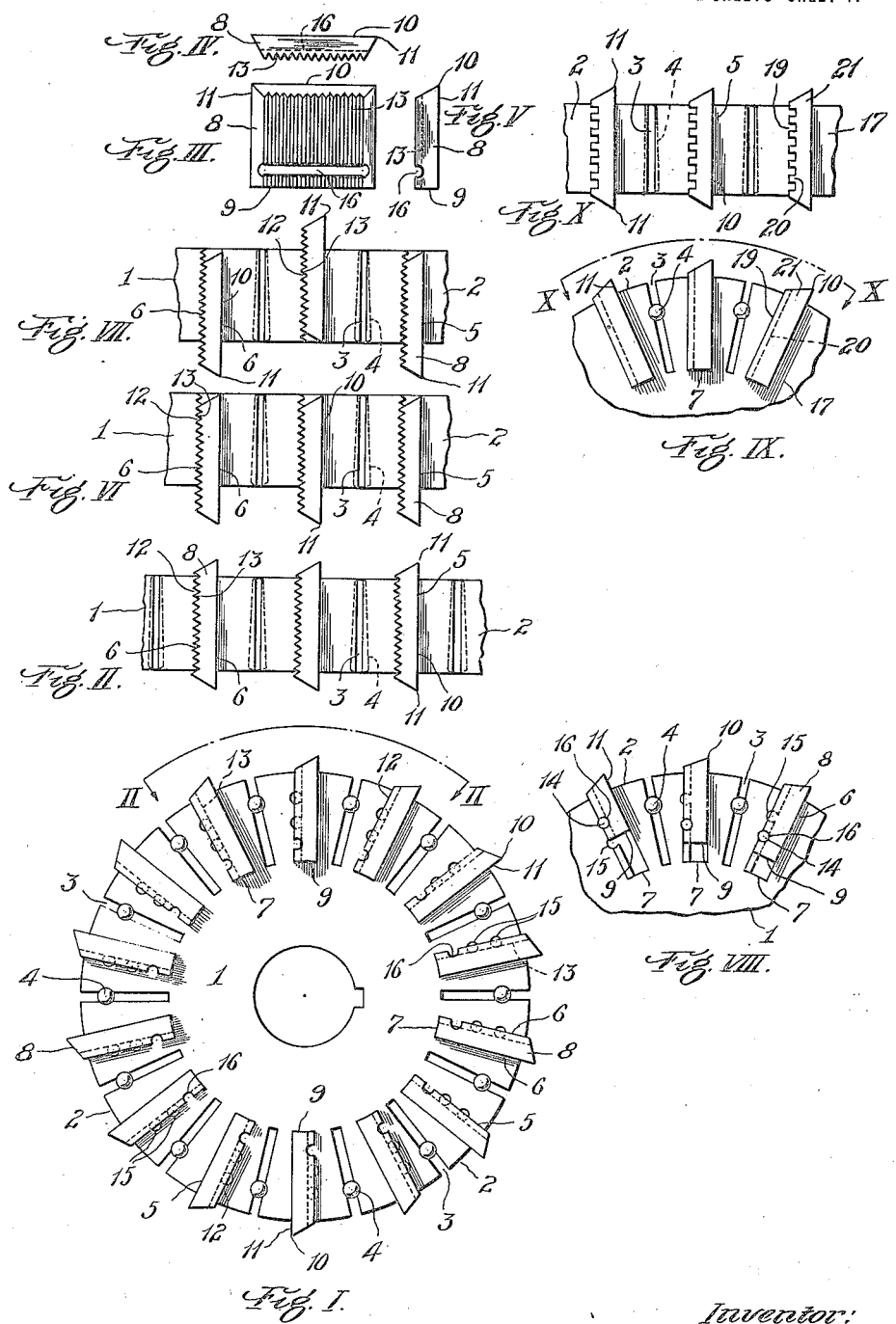

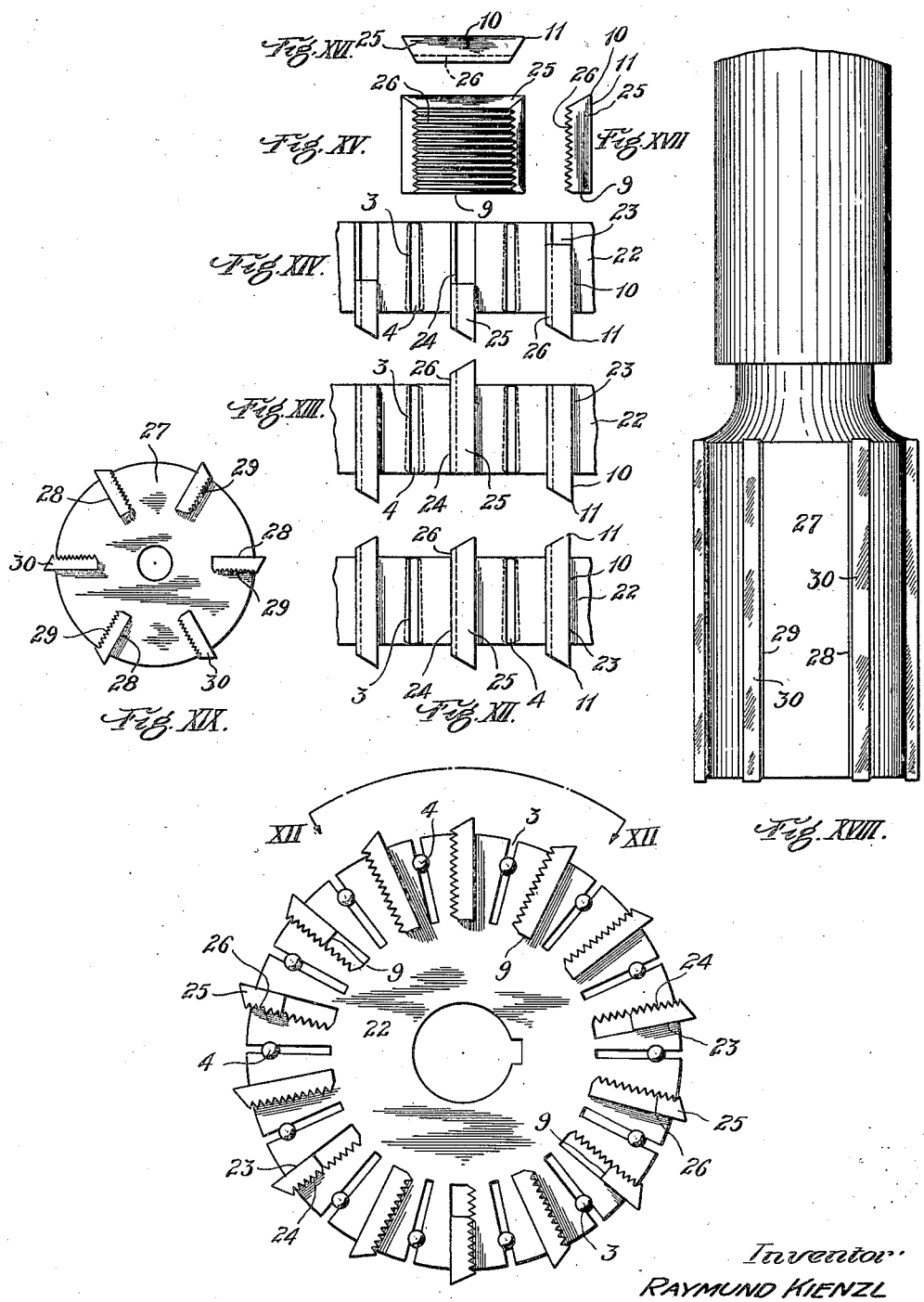

RAYMUND KIENZL, OF CLEVELAND, OHIO.

CUTTING TOOL.

1,422,988. Specification of Letters Patent. Patented July 18, 1922.

Application filed September 14, 1920. Serial No. 410,317.

*To all whom it may concern:*

Be it known that I, RAYMUND KIENZL, a citizen of the United States, residing at 1363 E. 80th St., Cleveland, in the State of Ohio and Cuyahoga County, have invented a new and useful improvement in Cutting Tools, of which the following is a specification, the principle of the invention being herein explained and the best mode in which I have contemplated applying that principle, so as to distinguish it from other inventions.

My invention pertains to an improvement in milling cutters and more particularly to two features of adjustments of a blade in different directions with reference to the supporting head.

I have long been familiar with this art and knowing milling cutters to be expensive and subject to rapid wear, have sought not only to increase the adaptability of a tool of this character but to make possible a prolongation of the life of its blades. Accordingly, the object of my invention is to provide a step by step adjustment of a blade in its cutter head slot both in a direction along that is to say, substantially parallel to, the axis of the tool and also in an in and out direction or in other words, with a movement toward and away from the axis.

Adverting to the drawings:

Figure I is a side elevation of a milling cutter embodying my invention.

Figure II is a developed plan view taken on line II—II of Figure I.

Figures III, IV and V are three different elevations of a blade exemplifying the features of my invention.

Figure VI is a developed plan view like Figure II but showing the blades adjusted to cut on only one side.

Figure VII is a similar developed plan view showing the blades staggered or arranged alternatively to cut on opposite sides.

Figure VIII is a fragmentary side elevation showing the manner of effecting the in and out adjustment to enable the use of the greater portion of the blade.

Figure IX is a fragmentary side elevation of the milling cutter showing a modified form.

Figure X is a developed plan view taken on line X—X of Figure IX.

Figure XI is a side elevation of a milling cutter with a modified adjustable fitting between the head and blade.

Figure XII is a developed plan view on line XII—XII of Figure XI.

Figure XIII is a similar view showing the blades staggered.

Figure XIV is a figure similar to Figures XII and XIII showing variously worn blades in position.

Figures XV, XVI and XVII are three side views of the modified type of blade.

Figures XVIII and XIX illustrate my invention applied to a reamer.

A milling cutter head comprises a periphery 2 fashioned with channels 3, in this instance shown to extend in a radial direction. The walls of the channels 3 are fashioned with enlargements extending in a direction substantially parallel to the axis of the cutter and are adapted to receive tapered pins 4 whereby the walls of the channels 3 may be slightly sprung apart in a manner well known because old practice. Also extending from the periphery 2 between each of the channels 3 are slots 5 which are shown to extend in a radial direction but such direction may vary. The slots 5 are defined by walls 6 and a bottom 7 and are purposed to accommodate and seat each with a close mechanical fit a blade 8 including an inner edge 9 adapted to abut the bottom 7. Each blade 8 has one edge 10 for affecting boring cuts and another edge 11 for affecting end mill work.

Of course blades are subject to wear so that each of the cutting edges 10 and 11 require resharpening. My invention proposes means whereby a double step by step adjustment of the blade may be accomplished to compensate for progressive wear. According to the form arbitrarily selected as the preferred, the adjustment movement is enabled by a tongue and groove connection and manifestly a series of complementary tongues and grooves are desirable.

In order to make possible the lateral adjustment of a blade 8 one wall 6 is fashioned with a series of tongues 12 adapted to cooperate with a complementary series of grooves 13 fashioned on one side of the blade. The tips of the tongues 12 and the bottom of the grooves 13 follow lines extending in a substantially radial direction so that each series of tips and bottoms extend as rows in a direction substantially parallel to the axis of the cutter. In this manner each blade may be inserted in a direction toward the axis of the cutter so that its cutting edges 11 may be disposed any chosen distance beyond the side of the cutter head 1. The various possible positions of the blades are clearly indicated in Figures II, VI and VII. When it is desired to support a worn blade, which has been shortened by the process of resharpening, so that its edge 9 will be firmly held spaced from the bottom 7 a cylindrical pin 14 is caused to occupy one of a series of bores extending parallel to the axis of the cutter head and formed by opposed grooves 15 and 16 in the wall 6 and blade 8 respectively as is well shown in Figures I and VII. As will now be observed I have provided a double step by step adjustment enabling the blade to be more frequently ground and therefore its effective life lengthened.

The modification shown in Figures IX and X resides in a change in the shape of the tongues and grooves by means of which the blades are adjustably fitted in place. A head 17 has peripheral slots, one wall of each of which is rabbeted at 19 to form right angular tongues and grooves for cooperation with a complementarily rabbeted edge 20 on each blade 21.

The modification illustrated by the several views on Sheet 2 consists in an alteration of the same kind of tongue and groove connection shown in Figure I the connection here being accomplished at an angle of ninety degrees removed from the angle of insertion movement established in Figure I. A cutter head 22 is provided with peripheral slots 23, one wall of each of the latter being rabbeted at 24 in an axial direction toward instead of in a direction parallel to the axis of a cutter head. Each blade 25 has one side complementarily rabbeted at 26, so that the blade is to be inserted from the side and adjusted in a direction parallel to the axis instead of being inserted from the periphery and adjusted toward or away from the axis. Figures XII to XIV inclusive show various positions to which the blades 25 may be adjusted, Figure XIII showing the blades staggered alternatively to project on opposite sides, whereas Figure XIV shows how comparatively short blades due to regrinding may be longer used.

I claim:—

1. A cutting tool comprising a head and a blade mounted for adjustment movement in two distinct directions relatively thereto, and means for securing said blade against movement in one direction and further means for securing against movement in the other direction.

2. A cutting tool comprising a head and a blade mounted therein for step by step adjustment movement in lateral and in and out directions, and means for securing said blade against movement in one direction and further means for securing against movement in the other direction.

3. A rotary cutting tool comprising a head provided with a slot, a blade occupying said slot, said parts having a plural tongue and groove connection along lines extending toward the axis whereby to enable insertion toward the axis and adjustment in a prescribed direction at an angle to the direction of insertion movement.

4. A rotary cutting tool comprising a cylindrical head provided with a peripheral slot, a blade occupying said slot, said parts having a tongue and groove connection extending in the same general direction as that of the axis and a plural tongue and groove connection extending toward the axis whereby to enable effective adjustment in both directions.

5. A rotary cutting tool comprising the combination of a head provided with a peripheral slot, a wall of said slot being fashioned with a series of grooves extending in a prescribed direction, a wall of said slot also fashioned with another series of grooves extending in a different direction and a blade insertible into said slot and provided with a series of tongues, each tongue adapted to occupy any one groove of the series of grooves.

6. A rotary cutting tool comprising the combination of a head provided with a peripheral slot, one wall of said slot being fashioned with two series of intersecting grooves extending in right angularly related directions, and a blade insertible into said slot and provided with tongues each adapted to occupy a groove of one of said series of grooves, said blade being moreover fashioned with a groove adapted to communicate with one of the grooves of the other series of head grooves, and a locking pin insertible into said communicating pair of grooves.

7. A rotary cutting tool comprising the combination of a head provided with a peripheral slot, a wall of said slot being fashioned with a series of tongues and grooves extending radially toward the axis, and a blade insertible into said slot and provided all with complementary grooves and tongues to be fitted with the tongues and grooves of said wall, whereby the insertion and adjustment movements are in right-angularly related directions.

8. A rotary cutting tool comprising the combination of a head provided with a peripheral slot, a wall of said slot being fashioned with a series of grooves extending in a prescribed direction, a blade insertible into said slot and provided with a groove adapted to be opposed to one of said wall grooves to form in conjunction with each other a composite bore, and a pin insertible in said bore, said parts furthermore having a distinct tongue and groove connection enabling adjustment in a different direction.

9. A cutting tool comprising a head having a slot, a wall of said slot being fashioned with a plurality of grooves, a blade insertible in said slot and fashioned with a plurality of tongues adapted in varying numbers to fit a corresponding number of said grooves whereby to enable adjustment in one direction of said blade in said slot, and means comprising a groove in said head and a groove in said blade which extend at an angle to said first mentioned grooves and tongues together with a pin to enable blade adjustment in another direction.

10. A cutting tool comprising a head having a slot, a wall of said slot being fashioned with a plurality of aligned tongues, a blade insertible in said slot and fashioned with a plurality of grooves adapted in varying numbers to accommodate a corresponding number of said tongues whereby to enable adjustment in one direction of said blade in said slot, there being a groove in said head and a groove in said blade which are adapted to communicate and which extend at an angle to said first mentioned grooves and tongues, and a pin insertible in said communicating grooves.

11. A cutting tool comprising a head provided with a slot, a blade adapted to occupy said slot, a wall of said slot and a surface of said blade being fashioned one with a groove and the other with a plurality of grooves each adapted alternatively to be brought into communication with said first mentioned groove, and locking means adapted to occupy any communicating pair of grooves.

12. A cutting tool comprising a head provided with a slot, a blade adapted to occupy said slot, a wall of said slot being fashioned with a plurality of parallel grooves, said blade being fashioned with a groove adapted to be opposed to any one of said wall grooves, each adapted alternatively to be brought into communication with said first mentioned groove, and a pin adapted to occupy any opposed pair of grooves.

13. A cutting tool comprising a head provided with a slot and a blade adapted to occupy said slot, said head and blade having a double tongue and groove connection along angularly related lines and one of said parts being fashioned with extra complemental conformations, the arrangement being such as to enable adjustment singly in either of two directions.

Signed by me, this 13th day of August, 1920.

RAYMUND KIENZL.